United States Patent
Spitz et al.

3,787,779
Jan. 22, 1974

[54] ADJUSTABLE WAVELENGTH OPTICAL SOURCE USING THE SIMULATED EMISSION EFFECT

[75] Inventors: Erich Spitz; Daniel B. Ostrowsky, both of Paris, France

[73] Assignee: Thomson-CSF, Paris, France

[22] Filed: Apr. 14, 1972

[21] Appl. No.: 243,948

[30] Foreign Application Priority Data
May 14, 1971 France ................................ 71.17558

[52] U.S. Cl. ............................ 331/94.5, 350/160 R
[51] Int. Cl. .............................................. H01s 3/10
[58] Field of Search .............. 331/94.5; 350/160 LC

[56] References Cited
OTHER PUBLICATIONS

Elson, Experimental Display Devices Use Films of Liquid Crystals, Aviation Week and Space Technology (July 8, 1968), pp. 71–72.

Castellano, Now that the Heat is Off, Liquid Crystals Can Show Their Colors Everywhere, Electronics (July 6, 1970), pp. 64–70.

Subramanyam, Optical Reflection From Cholesteric Liquid Crystal Films, Applied Optics, Vol. 10, No. 2, (February 1971), pp. 317–320.

*Primary Examiner*—William L. Sikes
*Attorney, Agent, or Firm*—Cushman, Darby & Cushman

[57] ABSTRACT

The present invention relates to stimulated emission radiation sources and, more precisely, to a dye laser in which the wavelength of the radiation emitted is varied by modifying the voltage applied to a thin film of a cholesteric liquid crystal which replaces one of the mirrors of the resonant optical cavity. This invention can be used as an adjustable wavelength coherent radiation source.

1 Claim, 1 Drawing Figure

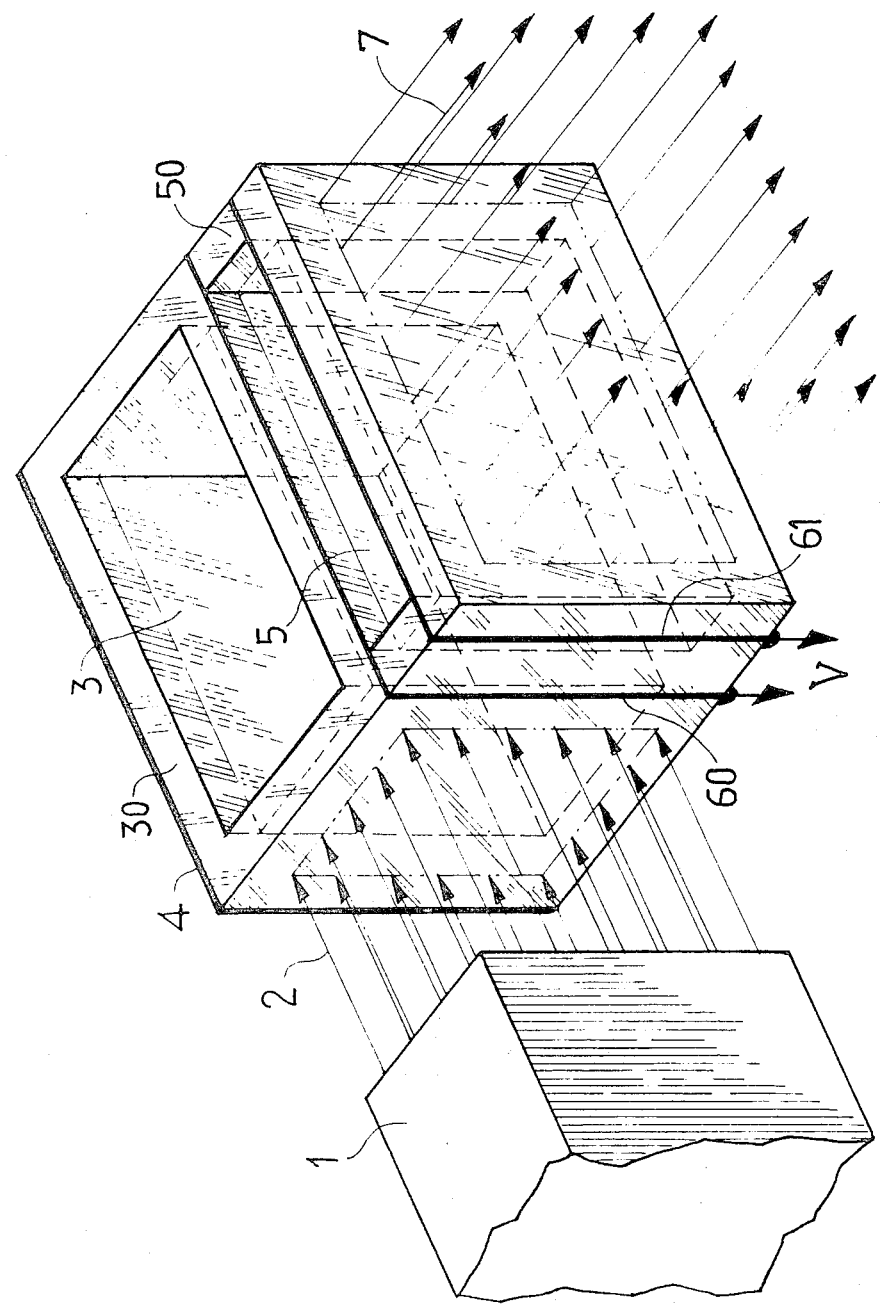

ADJUSTABLE WAVELENGTH OPTICAL SOURCE USING THE SIMULATED EMISSION EFFECT

The present invention describes an optical source based on the stimulated emission of a pumped active medium constituted by a liquid environment or an amorphous material, the wavelength of emission being adjustable by means of a cholesteric liquid crystal film which is subjected to a variable electrical potential difference.

Those skilled in the art will be aware that it is possible to obtain media which, under the pumping action of light give rise to stimulated emission, this by placing in solution certain organic dyes either in a liquid or in an amorphous solid. One significant property of media of this kind is that the stimulated emission can occur within a relatively wide continuous spectral range; the selection of the desired wavelength is then usually made by tuning the resonant cavity by means of a diffraction grating whose inclination is adjustable.

The proposal in the present invention is to replace this wavelength selection device which is expensive, bulky and slow, by a less expensive thin-film device which enables a much simpler geometric disposition of the resonant cavity to be achieved; this device furthermore makes it possible, by the application of a low voltage, to effect very fast scanning of the spectral range within which stimulated emission occurs.

According to the present invention, there is provided: a stimulated emission optical source, emitting wavelengths adjustable by means of applied voltages and comprising:
 an active medium,
 pumping radiation generator, for producing said stimulated emission in said medium,
 a flat mirror,
 a semi-reflective device associated with said mirror in order to form an optical cavity containing said active medium, said cavity having a high quality factor for adjustable wavelengths, said quality factor being adjustable by means of said applied voltages,
 said semi reflective associated device including a cholesteric liquid crystal film, at least two transparent electrodes, and means for applying said voltages to said electrodes and across said film; said film having a first and a second face and said first and second faces being respectively equipped with at least one of said electrodes.

For a better understanding of the invention, and to show how the same may be carried into effect, reference will be made to the ensuing description and the attached FIGURE which shows an adjustable wavelength optical source in accordance with the invention.

In the example illustrated, a light generator 1 produces an excitatory light beam 2, called the pumping radiation. This radiation triggers stimulated emission in an active medium 3 contained in a parallelepiped vessel 30 having transparent walls; the beam 2 is perpendicular to two of the shorter faces of the vessel. On one of the longer faces, a coating 4 having a high reflection coefficient and acting as a mirror, is deposited. Adjoining the other longer face of the vessel 30, there is a vessel 50, likewise of parallelepiped form and sharing one of the longer faces of the vessel 30; the longer faces of the two vessels are identical in size and the vessel 50 is extremely narrow in the direction perpendicular to said longer faces. The vessel 50 contains the cholesteric liquid crystal film 5. The longer faces of the vessels 30 and 50 are carefully aligned and parallel. The interval walls forming the longer faces of the vessel 50 are covered with a conductive transparent film forming two electrodes 60 and 61 which enclose the liquid crystal film between them and are subjected to a variable electrical potential difference V. The beam of coherent light 7, resulting from the stimulated emission in the active medium 3, is emitted perpendicularly to the liquid crystal film.

The operation of the device is as follows: Those skilled in the art will be aware that cholesteric crystals have a reflectivity which varies radically with wavelength and exhibits a peak of very narrow width where it reaches a value close to unity. This reflectivity peak can be shifted through the spectrum by means of an electric field. The cholesteric crystal film then behaves like a mirror whose coefficient of reflection varies with the wavelength; this mirror, associated with the flat mirror 4, forms an optical resonant cavity having a high quality factor within the narrow spectral range corresponding to the peak.

The stimulated emission in the active medium, under the effect of the pumping radiation, will only occur within the spectral interval in which the quality factor of the cavity is sufficiently high. The voltage V which, applied to the two electrodes 60 and 61, shifts the wavelength of the reflectivity peak of the film 5, thus makes it possible to control the wavelength of the coherent radiation beam 7 emitted by the laser, this in fact throughout the spectral interval in which the medium 3 is capable of producing stimulated emission.

The device described can operate with a wide variety of active media. One possible example is umbelliferone in solution in a liquid or in amorphous solid ; the spectral range within which it is possible to excite stimulated emission, is then around 2,000 A. Radiation emitted in the ultraviolet range, for instance by a nitrogen laser, could be used as pumping radiation. The cholesteric crystal film can be made thin, in the order of about ten micron ; the adjusting voltage applied is then low and less than ten volt. It is possible to use tin-oxide films as transparent electrodes.

A wide variety of chloresteric crystals are now available. In the case of all these, the spectral position of the reflectivity beam is likewise highly sensitive to the crystal temperature. The crystal will be chosen from amongst those whose temperature coefficient is lowest ; nevertheless, thermostatic control of the device can be necessary.

As the FIGURE shows, the assembly constituted by the active medium, the liquid crystal film and the mirror, is extremely simple and compact. The configuration in accordance with the invention makes it possible furthermore to provide a large emissive area. It is also possible, by arranging different electrodes on one of the crystal faces, these electrodes being controlled by independent voltages and the common electrode located on the other face being placed at a reference voltage, to replace the coherent monochromatic beam 7 by as many elementary beams of different wavelengths, as there are independent electrodes.

What we claim is:
1. A stimulated emission optical source, emitting wavelengths adjustable by means of applied voltages and comprising :
 an active medium ;

a pumping radiation generator for producing said stimulated emission in said medium;

a flat mirror;

a semi-reflective device associated with said mirror in order to form an optical cavity containing said active medium, said cavity having a high quality factor for adjustable wavelengths, said quality factor being adjustable by means of said applied voltages; said semi-reflective associated device including a cholesteric liquid crystal film, at least two transparent electrodes, and means for applying said voltages to said electrodes and across said film; said film having a first and a second face and said first and second faces being respectively equipped with at least one of said electrodes.

* * * * *